(12) United States Patent
Olyaei (10) Patent No.: US 9,816,593 B2
(45) Date of Patent: Nov. 14, 2017

(54) CONTINOUSLY VARIABLE TRANSMISSION

(71) Applicant: Abbas Olyaei, Marand (IR)

(72) Inventor: Abbas Olyaei, Marand (IR)

(*) Notice: Subject to any disclaimer, the term of this patent is extended or adjusted under 35 U.S.C. 154(b) by 0 days.

(21) Appl. No.: 15/375,479

(22) Filed: Dec. 12, 2016

(65) Prior Publication Data

US 2017/0089428 A1  Mar. 30, 2017

Related U.S. Application Data

(60) Provisional application No. 62/265,462, filed on Dec. 10, 2015.

(51) Int. Cl.
*F16H 29/22* (2006.01)

(52) U.S. Cl.
CPC .................................. *F16H 29/22* (2013.01)

(58) Field of Classification Search
None
See application file for complete search history.

(56) References Cited

U.S. PATENT DOCUMENTS

| | | | | |
|---|---|---|---|---|
| 4,112,546 A * | 9/1978 | Muller | .................. | A22C 11/107 452/35 |
| 4,307,629 A * | 12/1981 | Moller | ..................... | F16H 3/74 475/255 |
| 4,813,299 A | 3/1989 | Hamane et al. | | |
| 7,878,935 B2 * | 2/2011 | Lahr | ........................ | F16H 29/02 475/185 |
| 8,425,364 B2 | 4/2013 | Lahr | | |
| 2006/0154774 A1 * | 7/2006 | Naude | ...................... | F16H 29/04 475/16 |
| 2015/0198224 A1 | 7/2015 | Wu | | |

OTHER PUBLICATIONS

A, K. M. Mohiuddin, Elctro-Mechanically Controlled Continuously Variable Transmission System for Passenger Cars, Proceedings of the International Conference on Mechanical Engineering, Dec. 2009, Dhaka, Bangladesh, pp. 1-6.
H. S. Patil, An experimental study on full toroidal continuously variable transmission system, International Journal of Advanced Design and Manufacturing Technology, Dec. 2011, vol. 5, Issue 1, p. 19.
Andrew J. Fox, Design and analysis of a modified power split continuously variable transmission, Doctoral Dissertation, West Virginia University, 2003.

* cited by examiner

*Primary Examiner* — Derek D Knight
(74) *Attorney, Agent, or Firm* — NovoTechIP International PLLC (57) ABSTRACT

In a continuously variable transmission (CVT) system, an input shaft receives power from an external source and rotates an intermediate mechanism that converts the rotation to an oscillatory movement and converts the oscillatory movement to a one-way rotation that drives an output shaft, with transmission ratio according to load on the output shaft.

7 Claims, 11 Drawing Sheets

CONTINUOUSLY VARIABLE TRANSMISSION

CROSS REFERENCE TO RELATED APPLICATION

This application claims the benefit of priority from pending U.S. Provisional Patent Application No. 62/265,462, filed on Dec. 10, 2015, and entitled "CONTINUOUSLY VARIABLE TRANSMISSION," which is incorporated herein by reference in its entirety.

TECHNICAL FIELD

The present disclosure generally relates to a transmission system, and more particularly to a continuously variable transmission (CVT) system.

BACKGROUND

A continuously variable transmission (CVT), also known as a single-speed transmission, step-less transmission, or, in case of motorcycles, a twist-and-go, is an automatic transmission that can change the ratio of power transmission uniformly through a continuous range of effective gear ratios. Unlike mechanical transmissions that offer a fixed number of gear ratios, a CVT is not restricted to a finite number of ratios, capable of providing an infinite number of gear ratios. A CVT may be used in a wide variety of applications including automobiles, recreational vehicles, turbines and industrial equipment. There is a need in the art for CVT systems with lower power losses due to friction, and without a need for complex control systems.

SUMMARY

The following brief summary is not intended to include all features and aspects of the present application, nor does it imply that the application must include all features and aspects discussed in this summary.

Various exemplary apparatuses are disclosed, and examples may include a transmission system that may be configured to deliver power with a variable transmission ratio. The transmission system may include: an input shaft that may be configured for receiving power from an external power source, having two pinions mounted at either ends thereof and rotatable therewith; two rotating members that may be rotatably mounted opposite one another, each may have a gear mounted thereon and rotatable therewith, each gear may be configured to mesh with the respective pinion on the input shaft and receive power therefrom; two radial rails that may be mounted radially on each rotating member and may be configured to be rotatable therewith; a free shaft that may have two sliding members that may be attached thereto at either ends thereof, each sliding member may be configured to surround and be slidably coupled to the respective sliding rail and thereby slidably couple the free shaft with the sliding rails at either ends thereof; and a plurality of follower assemblies that may be mounted around the free shaft. Each follower assembly may include: a follower shaft that may be rotatably mounted parallel to the free shaft with a one-way bearing unit coupled thereon at one end thereof; and a slotted link that may have a proximal end that may be pivotally mounted on the follower shaft and a slot that may be configured to engage with the free shaft which may facilitate a reciprocal linear movement of the free shaft therein; a planetary gear system that may have a plurality of planet gears that can be mounted on the respective follower shafts, the planet gears may be arranged around a sun gear and mesh therewith; each planet gear may be mounted on the respective one-way bearing unit on the respective follower shaft and may be configured to transfer the rotational movement of the follower shaft to the sun gear; and an output shaft with the sun gear mounted thereon and rotatable therewith that may be configured to deliver the power received via the sun gear.

In an aspect, the free shaft and the plurality of slotted links engaged therewith may be configured to transform the rotational movement of the rotating members into the oscillatory movement of the slotted links with a variable amplitude. The plurality of the follower shafts and the planet gears mounted thereon may be configured to transform the oscillatory movement of the slotted links into the rotational movement of the sun gear and the variable transmission ratio between the input shaft and the output shaft may be a function of the variable amplitude of the oscillatory movement of the slotted links.

In one implementation, the free shaft may be slidably movable on the radial rails in a sliding path from the center of the rotating members to an outer point on the perimeter of the rotating members.

In another implementation, the plurality of the follower assemblies may include at least two follower assemblies. The plurality of the planet gears may include at least two planet gears.

According to another implementation, the transmission system may further include a clutch mounted between the sun gear and the output shaft. In an aspect the clutch can be a spring clutch, and may be configured to compensate output velocity fluctuations induced as a result of the oscillatory movements of the follower assemblies.

Disclosed methods include delivering power with a variable transmission ratio, and can include rotating a rotatable input shaft with an external power, and rotatably driving two rotatable members with the rotatable input shaft, where the rotatable member can be supported to rotate on a shared center axis and spaced apart along the shared center axis. Example methods delivering power with a variable transmission ratio can also include converting the rotating of the two rotatable members to an oscillatory movement of each of a plurality of slotted links and, in an aspect, converting the oscillatory movement of each of the plurality of slotted links can be configured with a variable amplitude of the oscillatory movement. Example methods for delivering power with a variable transmission ratio can also include converting the oscillatory movement of each of the plurality of slotted links to a one-way rotation of a corresponding planetary gear among a plurality of planetary gears and, in an implementation, a ratio of the rotations of the two rotatable members to rotations of the corresponding planetary gear can be dependent on the amplitude of the oscillatory movement. Example methods for delivering power with a variable transmission ratio can also include driving a sun gear, coupled to an output shaft driving a resistance, with the one-way rotation of each of the plurality of planetary gears, and can include varying the amplitude of the oscillatory movement in response to a varying of the resistance driven by the output shaft.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

For purposes of explanation, specific nomenclature is set forth to provide a thorough understanding of exemplary embodiment of the present disclosure. However, it will be apparent to those skilled in the art that these specific details are not required to practice exemplary embodiments of the present disclosure. Descriptions of specific applications are provided only as representative examples. Various modifications to the exemplary implementations may be readily apparent to one skilled in the art, and the general principles defined herein may be applied to other implementations and applications without departing from the principles of the exemplar embodiment of the present disclosure. Practices according to concepts disclosed by the present disclosure are not intended to be limited to the implementations shown, are to be accorded the widest possible scope consistent with the principles and features disclosed herein.

Disclosed systems and apparatuses are directed to a self-adjustable CVT that may be configured for delivering power from an input shaft with a continuously variable transmission ratio to an output shaft. The power may be received from an external power source via the input shaft, and the input shaft may be coupled with and drive a rotational movement of an intermediate mechanism, which may be configured to transmit the power received from the input shaft to a planetary gear system with a continuously variable transmission ratio. In an aspect, the intermediate mechanism may be configured to transform the rotational movement of the input shaft into an oscillatory movement with a continuously adjustable amplitude and then convert this oscillatory movement to the rotational movement of the output shaft via the planetary gear set, thereby adjusting the transmission ratio needed in the output. In other words, the input power may be transmitted to the output shaft with a transmission ratio adjusted based on the amplitude of the oscillatory movement of the intermediate mechanism.

Figure 1A:
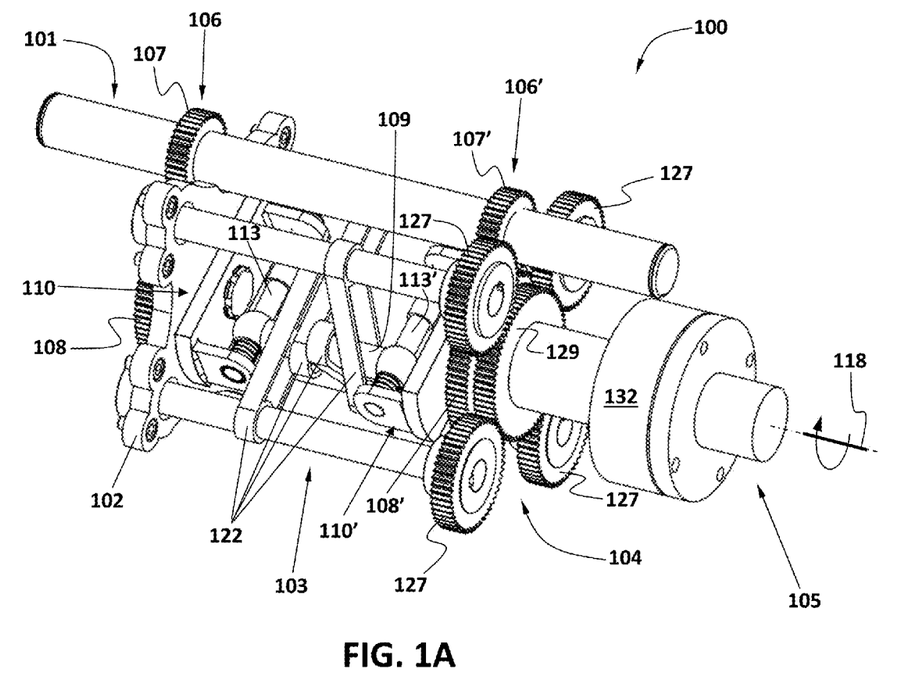
FIG. 1A illustrates an example implementation of the CVT system with four follower assemblies, according to one or more aspects of the present disclosure.
Figure 1B:
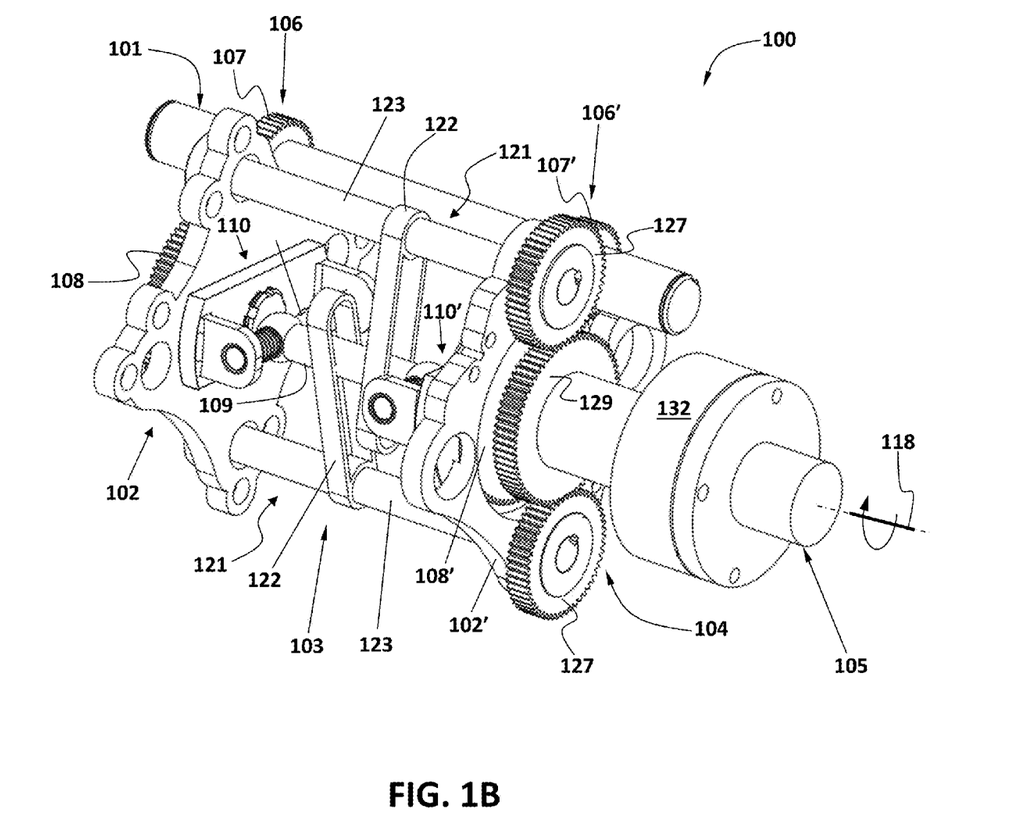
FIG. 1B illustrates an example implementation of the CVT system with two follower assemblies, according to one or more aspects of the present disclosure.

FIGS. 1A and 1B show perspective views of examples of the CVT system, according to one or more aspects of the present disclosure. Referring to FIGS. 1A and 1B, the exemplary CVT system 100 may include two spaced apart mounting members 102 and 102' (not visible in FIG. 1A) that may provide mounting means for mounting different parts of the CVT system 100; an input shaft 101 that may be configured to receive power from an external power source; an intermediate mechanism 103 that may be configured to continuously adjust the transmission ratio; a planetary gear set 104 that may be configured to receive the power from the intermediate mechanism 103 with the adjusted transmission ratio; and an output shaft 105 that may be coupled with the planetary gear set 104 and may be configured to deliver the power received from the planetary gear set 104 to an external consumer.

Referring to FIGS. 1A and 1B, the intermediate mechanism 103 may include two rotating members 110 and 110' that may be rotatably mounted opposite from one another on two rotating shafts 111 (visible and numbered in FIG. 2A) that pass through each mounting member 102 and 102'. The rotational axes of the rotating members 110 and 110' may be aligned with a central axis 118 of the CVT system 100. The input shaft 101 may be coupled with and drive the rotational movement of the rotating members 110 and 110' about the axis 118 via two gear-pinion sets 106 and 106' at either sides of the CVT system 100. The gear-pinion sets 106 and 106' may include two pinions 107 and 107' that may be coaxially mounted on the input shaft 101 at either sides of the CVT system 100; and two gears 108 and 108' that may be respectively mounted on the rotating shafts 111 (visible and numbered in FIG. 2A) and may be configured to mesh with corresponding pinions 107 and 107'. The power transmitted form the input shaft 101 via gear-pinion sets 106 and 106' to rotating members 110 and 110' may drive the rotational movement of the rotating members 110 and 110' about the central axis 118. Two parallel radial rails 113 and 113' may be radially mounted on respective rotating members 110 and 110'. Referring to the implementation shown in FIG. 2A, radial rail 113 may be radially mounted on the rotating member 110 using two mounting members 201 and radial rail 113' may be radially mounted on the rotating member 110' using two mounting segments 201'.

Figure 2A:
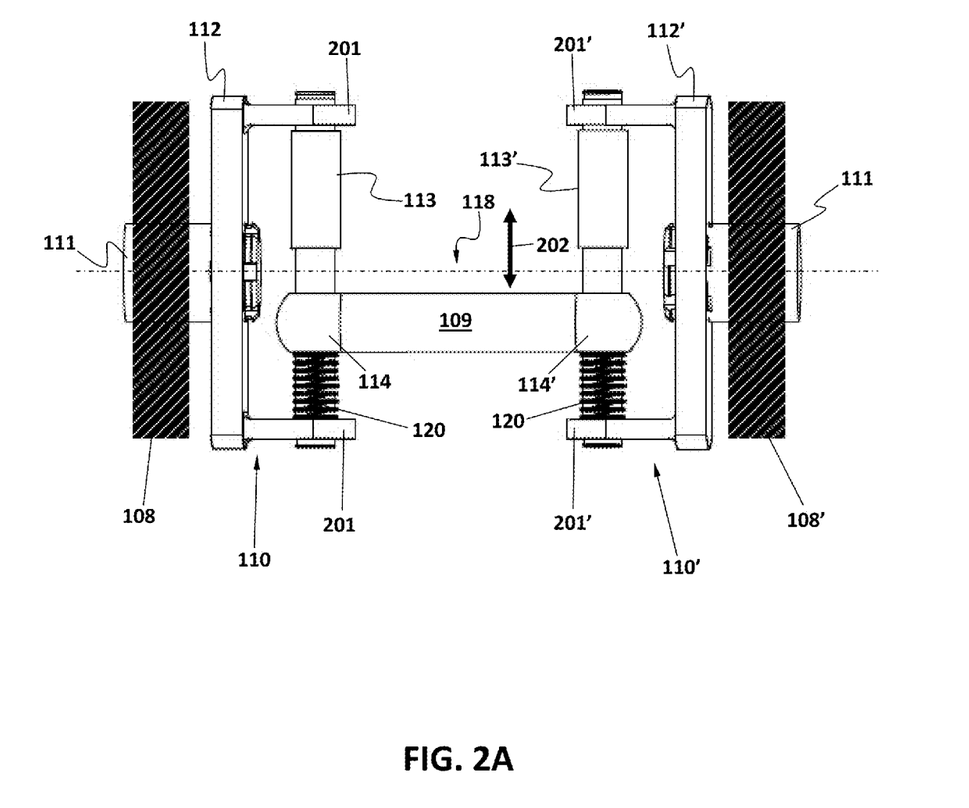
FIG. 2A illustrates a top view of an exemplary rotating guide subsystem, according to one or more aspects of the present disclosure.

Referring to FIGS. 1A, 1B and 2A, the intermediate mechanism 103 may include a free shaft 109 slidably mounted between the two rotating members 110 and 110'. Referring to FIG. 2A, the free shaft 109 may have two sliding segments 114 and 114' that may be formed on either ends of the free shaft 109 and may be configured to surround, and be slidably movable along radial rails 113 and 113'. As a result, the two radial rails 113 and 113' define a sliding track for the free shaft 109 and the free shaft may radially slide along the track formed by the parallel radial rails 113 and 113' back and forth in the direction shown by arrow 202. In an implementation, a restoring spring 120 may be utilized at the distal end of each sliding rails 113 and 113' that may be configured to restore the position of the free shaft 109 towards the central axis 118, as will be described in more detail in connection with FIGS. 5A and 5B later in this disclosure.

Figure 2B:
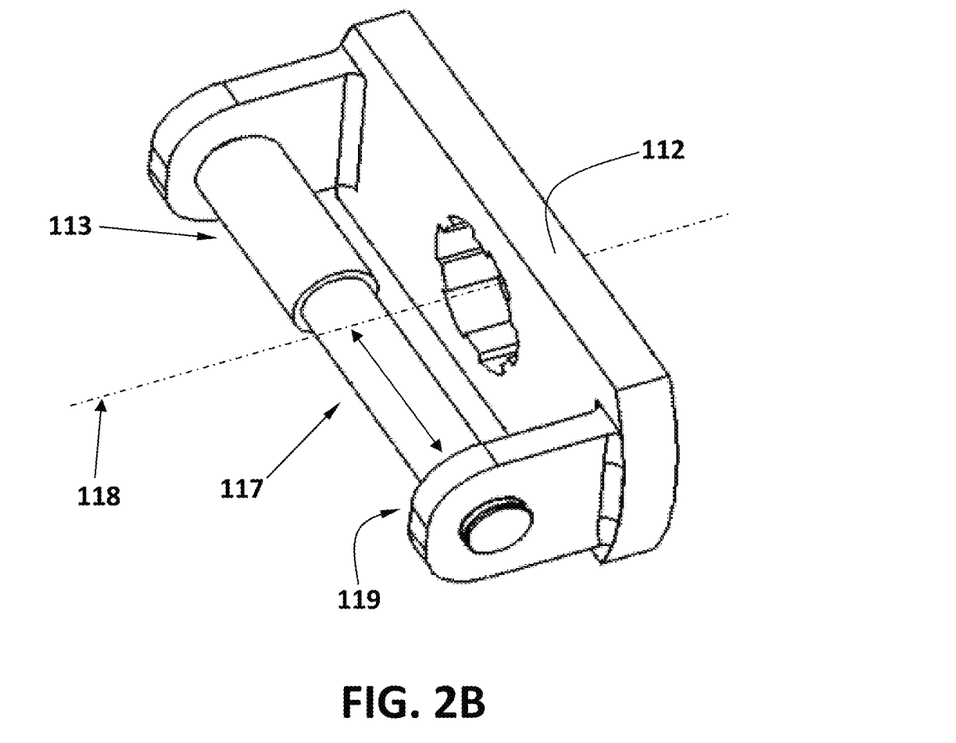
FIG. 2B is a perspective view of an exemplary rotating guide assembly, according to one or more aspects of the present disclosure.

Referring to FIGS. 2A and 2B, the sliding rails 113 and 113' may be configured as stepped bars with two different cross sections defining a sliding path 117 for the free shaft 109. The proximal end of the sliding path 117 may be near the central axis 118 of the rotating members 110, 110' and distal end of the sliding path 117 may be near their perimeters. In an implementation, a restoring spring 120 may be utilized at the distal end of the sliding path 117 that may be configured to restore the position of the free shaft 109 towards the central axis 118, as will be described in more detail later in this disclosure. Referring to the implementation shown in FIG. 2A, the rotating members 110, 110' may be rotatably coupled with gears 108 and 108' via coupling members 111.

Referring to FIG. 1B, the intermediate mechanism 103 may further include a number of follower assemblies 121, for example two follower assemblies 121 as shown in FIG. 1B or four follower assemblies (not explicitly numbered) as shown in FIG. 1A.

Figure 3A:
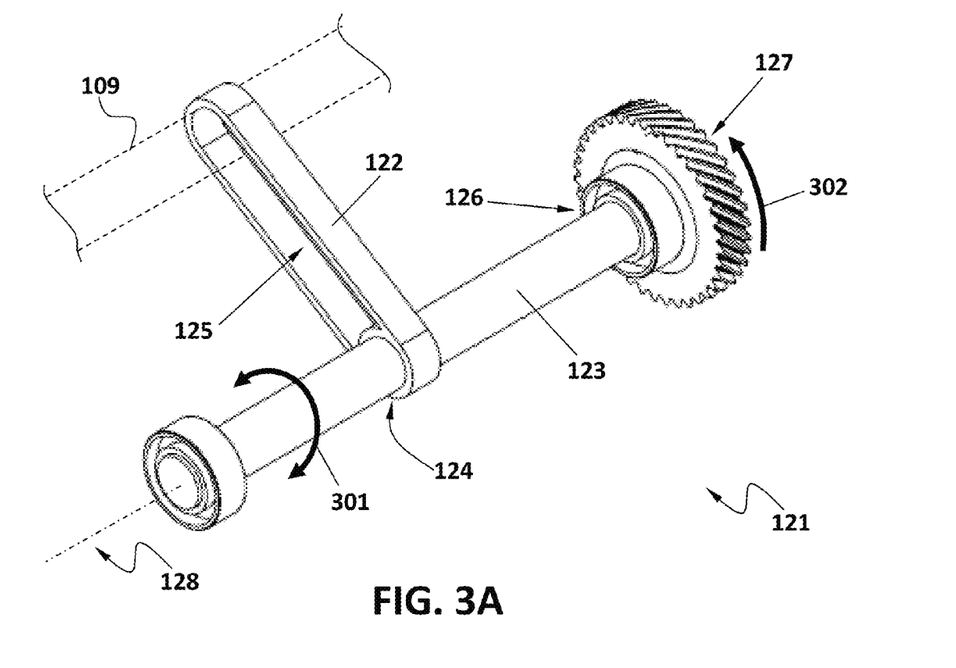
FIG. 3A is a perspective view of an exemplary follower assembly, according to one or more aspects of the present disclosure.
Figure 3B:
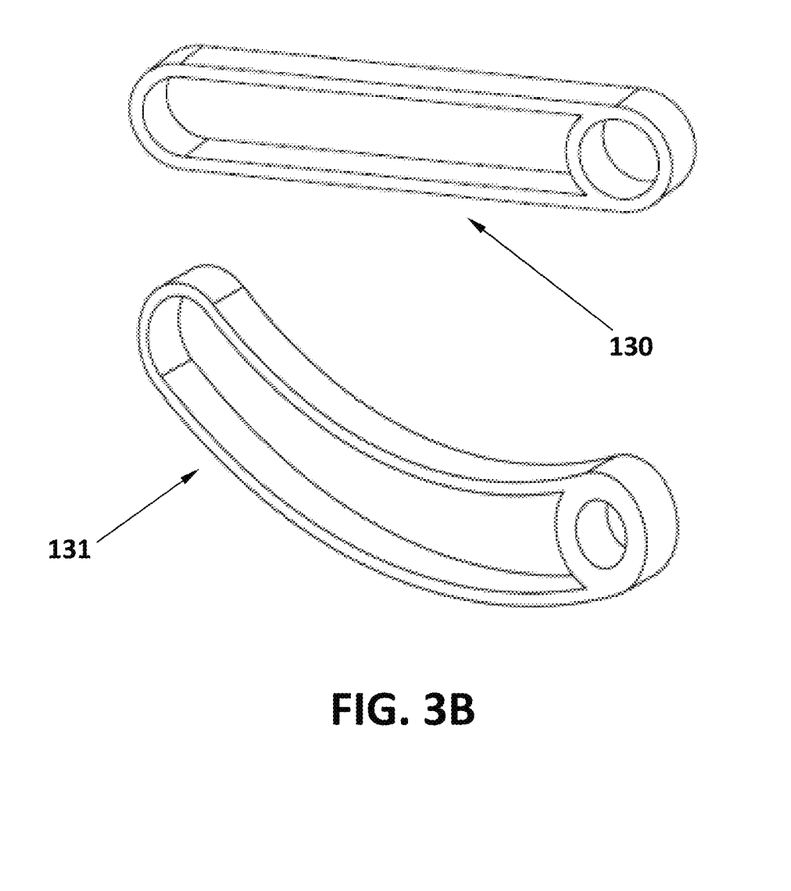
FIG. 3B illustrate two example implementations of a slotted link, according to one or more aspects of the present disclosure.

FIG. 3A illustrates an example of a follower assembly 121 that may include a slotted link 122, and a follower shaft 123. The proximal end of the slotted link 122 may be configured with a connecting segment 124 that may be configured to tightly surround and thereby be pivotally mounted on the follower shaft 123 without any unwanted sliding movements relative to the follower shaft 123. The slotted link 122 may pivot about the longitudinal axis 128 of the follower shaft 123. The slotted link 122 may be configured with a slot 125 through which, the free shaft 109 can be engaged with the slotted link 122. The free shaft 109 may have a free reciprocating linear movement along the slot 125. Referring to FIG. 3, the slotted link may be configured with a straight shape 130 or a curved shape 131.

Referring to FIGS. 1A and 1B, the free shaft 109 may pass through all slotted links 122. The rotational movement of the rotating members 110, 110' cause the rotational movement of the free shaft 109 about the axis 118 in a rotational path with a radius that may be defined by the radial distance of the free shaft 109 relative to the axis 118. The rotation of the free shaft 109 about axis 118 may cause an oscillating movement in the slotted links 122 about their pivot points. The position of the free shaft 109 on the radial rails 113 and 113' decides the amplitude of the oscillating movement of the slotted links 122. The further the free shaft 109 is away from the central axis 118, the larger is the amplitude of the oscillating movement of the slotted links 122.

Referring to FIG. 3A, the oscillating movement of the slotted link 122 about the pivot point defined by the connecting ring 124 drives a back and forth rotational movement of the follower shaft 123 about its longitudinal axis 128 in a direction shown by arrow 301.

Referring to FIGS. 1A and 1B, planetary gear set 104 may include a number of planet gears arranged around a sun gear. The number of planet gears may be equal to the number of follower assemblies. Referring to FIG. 3A, the planet gear 127 may be coupled at one end of the follower shaft 123 on a one-way bearing unit 126. The one-way bearing unit 126 may limit the rotation of the planet gear 127 to be in one direction. For example, when the follower shaft 123 rotates back and forth as shown by arrow 301, due to the presence of the one-way bearing unit 126, the planet gear rotates in one direction shown by arrow 302.

Referring to FIGS. 1A and 1B, the follower shafts 123 may drive the rotational movement of the planet gears 127. The planet gears 127 may be configured to mesh with the sun gear 129 and drive the rotational movement thereof. The one-way rotational movements of the planet gears 127 are transformed by the sun gear 129 into a uniform rotational movement of the output shaft 105. In some implementations, a clutch 132 may connect the sun gear 129 to the output shaft 105, in order to adjust the rotation of the sun gear 129 with the output shaft 105 without any power shock. The output shaft 105 may be coupled with external power consumers and may transmit power with a desired torque and rotational speed according to the load demands.

As the load on the output shaft 105 increases, the planet gears 127 must transmit more power, as a result, the follower assemblies 121 must oscillate with higher amplitudes, and therefore, the slotted links 122 urge the free shaft 109 to move towards larger radial distances from the central axis 118 and thereby the transmission ratio increases.

Figure 4A:
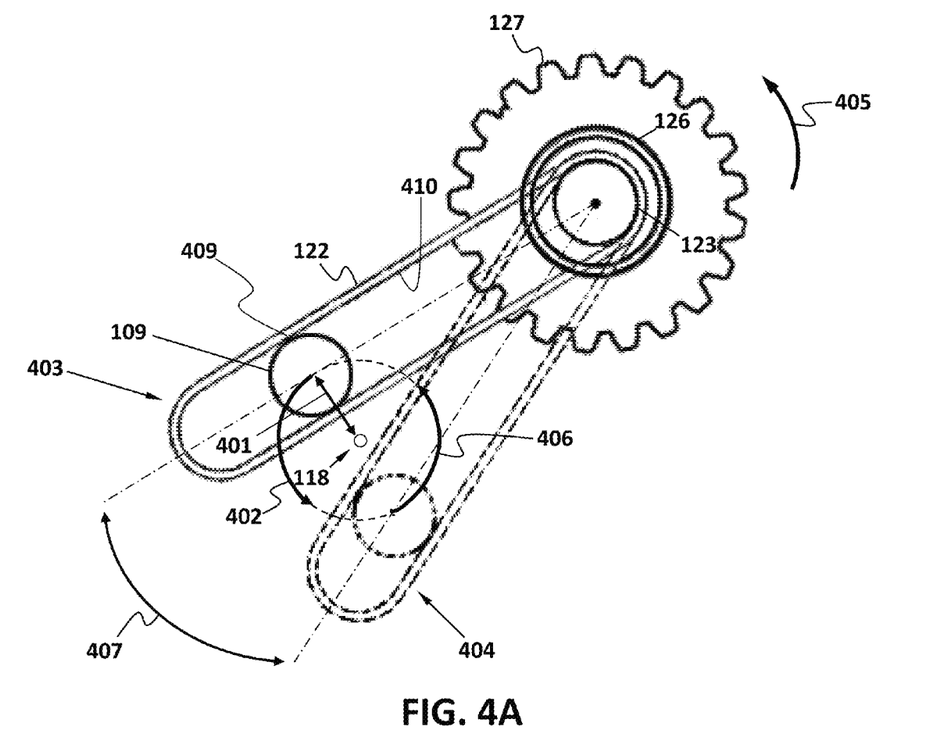
FIGS. 4A and 4B are front views of a follower assembly and a free shaft engaged therewith, according to one or more aspects of the present disclosure.

FIG. 4A shows an example of how the rotational movement of the rotating members may be transformed into the oscillating movements of the follower assemblies and how the radius of rotation of the free shaft about the central axis determines the amplitude of the oscillatory movement of each follower assembly. In the example shown in FIG. 4A, the free shaft 109 is positioned on the radial rails 113 and 113' (visible in FIG. 2B) close to the central axis 118. As the free shaft 109 rotates about the central axis 118 with a radius 401 in the direction shown by arrow 402, the slotted link 122 is urged to pivot about the longitudinal axis of the follower shaft 123 from an initial position 403 to a secondary position 404 and thereby rotates the planet gear 127 in the direction shown by arrow 405. Referring to FIG. 4A, as the free shaft 109 rotates back to its initial position in the direction shown by arrow 406, the slotted link 122 rotates clockwise form the secondary position 404 to the initial position 403, since a one-way bearing unit 126 is used to couple the follower shaft 123 with the planet gear 127, the planet gear 127 does not rotate when the slotted link 122 goes back to its initial position in the direction shown by arrow 406. As the free shaft 109 rotates in the direction shown by arrow 402, the slotted link 122 oscillates as shown by arrow 407.

Figure 4B:
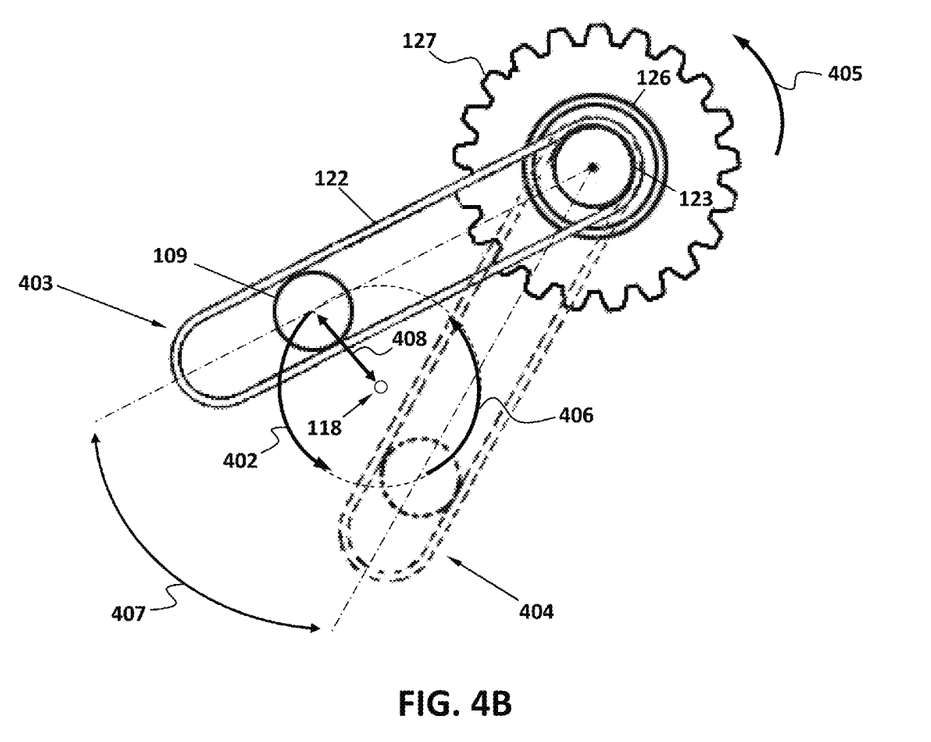

FIG. 4B shows an example of how the transmission ratio is self-adjusted when the load on the output changes. In this example, the output load has increased compared to the situation shown in FIG. 4A. An increase in the output load requires an increase in the output power, which means the planet gear 127 must deliver more power. To this end, the slotted link 122 must oscillate with higher amplitudes in order to be able to deliver higher powers. As a higher amplitude is needed for the slotted link 122, the free shaft 109 is urged to slide on the radial rails 113 and 113' (visible in FIG. 2B) along the sliding path 117 (visible in FIG. 2B) towards a higher radius 408. In this case the slotted link 122 oscillates as shown by arrow 407 with a higher amplitude compared to the example shown in FIG. 4A.

Referring to FIGS. 1A and 1B, the clutch 132 may be a spring clutch, which may be considered as a cylinder that may be connected to the output shaft 105 with a spring. The spring clutch 132 may cover the gap between the power transmitted by different follower assemblies due to their different operational phases, as was described in detail in connection with FIGS. 4A and 4B compensating the output velocity fluctuations induced as a result of the oscillatory movements of the intermediate mechanism 103, as well as giving the CVT 100 enough freedom to rotate slightly and get adjusted in sudden transmission ratio changes, such as in sudden break situations.

Referring to the FIG. 4A, the oscillating movement of slotted link 122 is a function of the corresponding contact point 409 at which the free shaft 109 is engaged with the slot 410 of the slotted link 122. A straight relation exists between the rotational speed of the output shaft and the amplitude of the oscillating movement of slotted link 122. As the free shaft 109 slides on the radial rails toward higher radiuses from the central axis 118, the amplitude of the oscillating movement of slotted link 122 increases, therefore the corresponding planet gear 127 mounted on the corresponding follower shaft 123 rotates faster and produces higher gear ratios. If output loading condition is in a way that the output shaft is limited to rotate in a specific velocity, it forces the follower assemblies to reduce their oscillation amplitude, and in turn the follower forces the free shaft 109 back to the smaller radiuses.

Calculation of Transmission Ratio

Figure 5A:
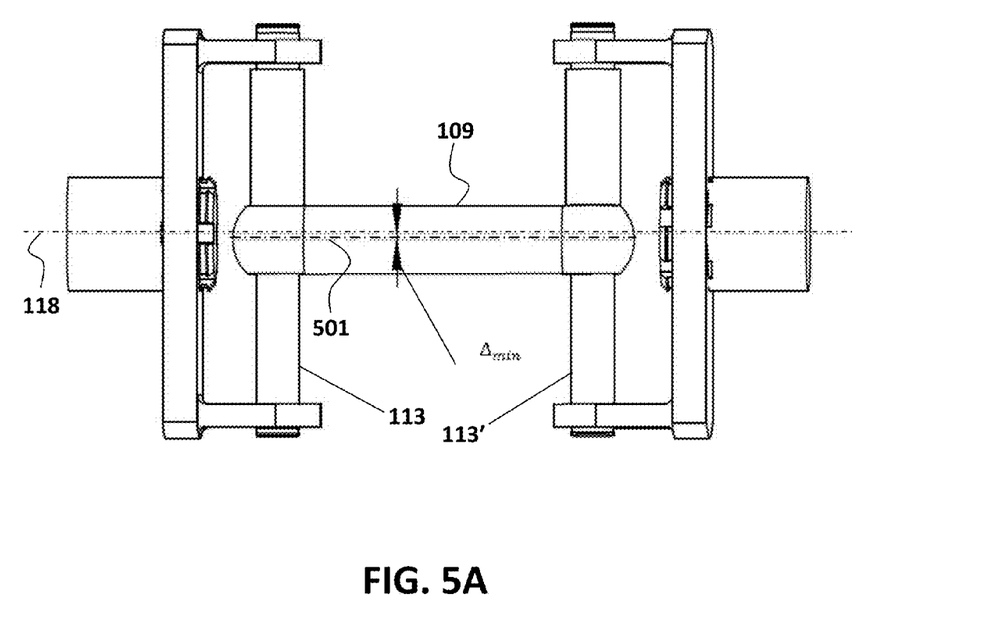
FIGS. 5A and 5B illustrate top views of an exemplary rotating guide subsystem, according to one or more aspects of the present disclosure.
Figure 5B:
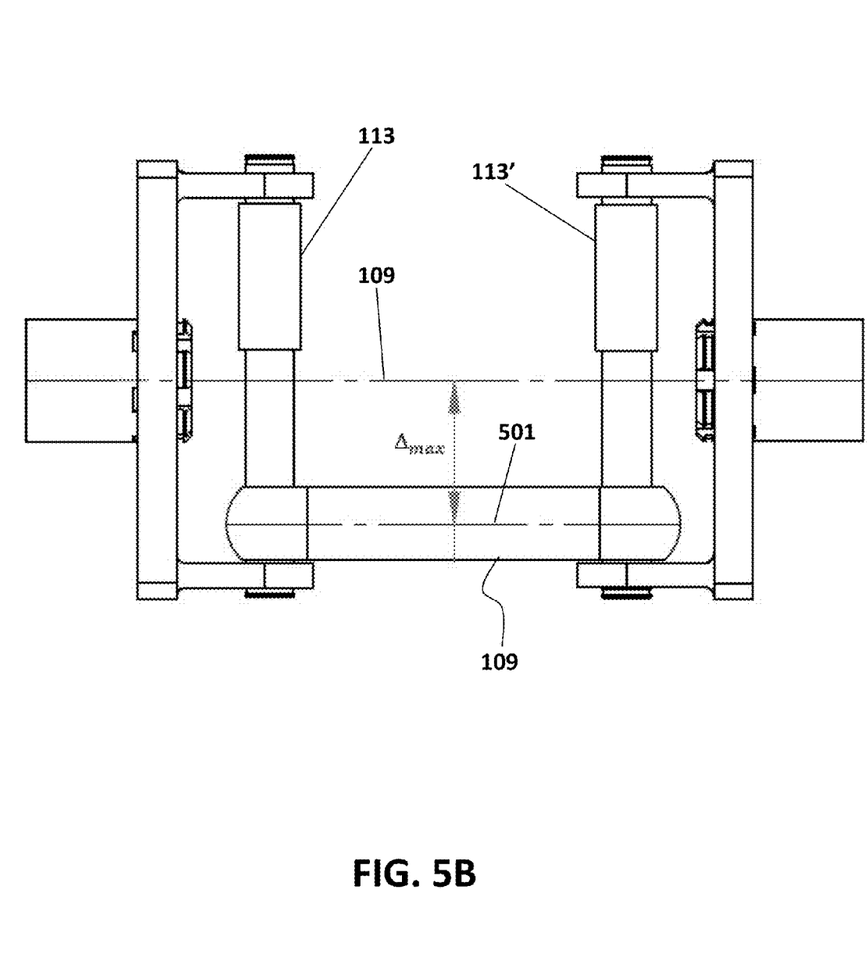

FIG. 5A shows the position of the free shaft 109 on the radial rails 113 and 113' with a minimum distance ($\Delta_{min}$) between the center of the free shaft 501 and the central axis 118 corresponding to a minimum transmission ratio. FIG. 5B shows the position of the free shaft 109 on the radial rails 113 and 113' with a maximum distance ($\Delta_{max}$) between the center of the free shaft 501 and the central axis 118 corresponding to a maximum transmission ratio. The minimum value of $\Delta$ may reach to very small amounts but it must be a little greater than zero ($\Delta > 0$), in order for CVT to start working. Because in the case of $\Delta = 0$ the CVT cannot start to change $\Delta$ with the help of centrifugal force due to the rotation.

Figure 6:
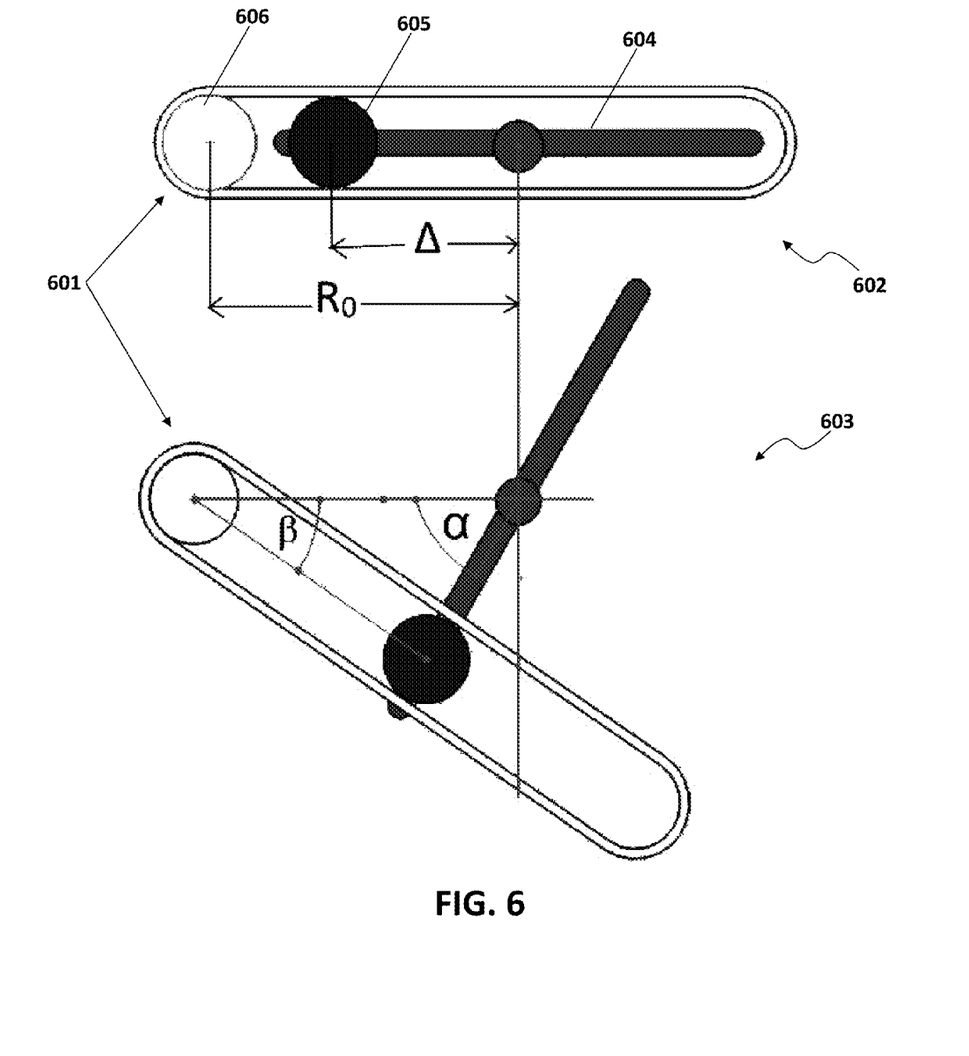
FIG. 6 illustrates a front view of a slotted link engaged with a free shaft on a rotating guide assembly, according to one or more aspects of the present disclosure.

FIG. 6 illustrates one example of a slotted link 601 in two different positions 601, 602. The radial distance between central axis of the follower shaft 606 and the central axis of the radial sliding rail 604 is represented as $R_0$; the radial distance between the central axis of the radial sliding rail 604 and the central axis of the free shaft 605 is represented by $\Delta$; input angular velocity is represented by $\omega_i$; and angular velocity of the follower shaft 123 is represented by $\omega_o$; Parameter "$\alpha$", the angular position of radial sliding rail 604 with respect to the horizontal direction, is free to change its value from zero to $2\pi$ as the free shaft 605 oscillates. The angle of slotted link 601 designated as "$\beta$" with respect to horizontal direction is a function of $\alpha$. This functionality can be expressed by Equation (1) below, as:

$$\tan(\beta) = \frac{\Delta \sin(\alpha)}{R_0 - \Delta \cos(\alpha)} \quad \text{Equation (1)}$$

For $$-\frac{\pi}{2} < \alpha < \frac{\pi}{2}$$

the transmission ratio may be expressed by Equation (2) below as $$R = \frac{\omega_o}{\omega_i} = \frac{\Delta}{R_0 - \Delta} \quad \text{Equation (2)}$$

while for $$\frac{\pi}{2} < \alpha < \frac{3\pi}{2}$$

the transmission ratio can be described by Equation (3) below as:

$$R = \frac{\omega_o}{\omega_i} = \frac{\Delta}{R_0 + \Delta} \quad \text{Equation (3)}$$

$\beta$ can take all values, maximum $\beta$ is achieved at $\alpha = \pi/2$ with a magnitude that can be expresses as Equation (4) below as $$\tan(\beta_{max}) = \frac{\Delta}{R_0} \quad \text{Equation (4)}$$

While the foregoing has described what are considered to be the exemplary embodiments, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of exemplary embodiments consistent with the present disclosure.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A transmission system configured to deliver power with a variable transmission ratio, comprising:
   an input shaft configured to receive power from an external power source, having two pinions, mounted at respective opposite ends of the input shaft, and rotatable therewith;
   two rotating members, each rotatably mounted on a respective one of two mounting members opposite one another, each rotating member having a gear mounted thereon and rotatable therewith, each gear configured to mesh with the respective pinion on the input shaft and receive power therefrom;
   two radial rails, each radial rail mounted radially on a corresponding one of the two rotating members and configured to be rotatable therewith;

a free shaft configured to be slidably coupled to the sliding rails at either ends thereof; and a plurality of follower assemblies mounted around the free shaft, each follower assembly comprising:
- a follower shaft rotatably mounted between the mounting members parallel to the free shaft with a one-way bearing unit coupled thereon at one end thereof; and
- a slotted link having a proximal end pivotally mounted on the follower shaft and a slot configured to engage with the free shaft configured to facilitate a reciprocal linear movement of the free shaft therein;

a planetary gear system having a plurality of planet gears mounted on the respective follower shafts, the planet gears arranged around a sun gear and mesh therewith; each planet gear mounted on the respective one-way bearing unit on the respective follower shaft and configured to transfer the rotational movement of the follower shaft to the sun gear; and an output shaft with the sun gear mounted thereon and rotatable therewith, configured to deliver the power received via the sun gear;

wherein, the free shaft and the plurality of slotted links engaged therewith are configured to transform the rotational movement of the rotating members into an oscillatory movement of the slotted links with a variable amplitude;

wherein, the plurality of the follower shafts and the planet gears mounted thereon are configured to transform the oscillatory movement of the slotted links into the rotational movement of the sun gear; and wherein, the variable transmission ratio between the input shaft and the output shaft is a function of the variable amplitude of the oscillatory movement of the slotted links.

2. The transmission system according to claim 1, wherein the free shaft is slidably movable on the radial rails in a sliding path from the center of the rotating members to an outer point on the perimeter of the rotating members.

3. The transmission system according to claim 1, wherein the plurality of the follower assemblies include at least two follower assemblies.

4. The transmission system according to claim 1, wherein the plurality of the planet gears include at least two planet gears.

5. The transmission system according to claim 1, further comprising a clutch mounted between the sun gear and the output shaft.

6. The transmission system according to claim 5, wherein the clutch is a spring clutch, and is configured to compensate output velocity fluctuations induced as a result of the oscillatory movements of the follower assemblies.

7. A method for delivering power with a variable transmission ratio, comprising
- rotating a rotatable input shaft with an external power;
- rotatably driving two rotatable members with the rotatable input shaft, the rotatable members being supported to rotate on a shared center axis and spaced apart along the shared center axis;
- converting the rotating of the two rotatable members to an oscillatory movement of each of a plurality of slotted links, wherein converting the oscillatory movement of each of the plurality of slotted links is configured with a variable amplitude of the oscillatory movement;
- converting the oscillatory movement of each of the plurality of slotted links to a one-way rotation of a corresponding planetary gear among a plurality of planetary gears, wherein a ratio of the rotations of each of the two rotatable members to rotations of the corresponding planetary gear is dependent on the amplitude of the oscillatory movement;
- driving a sun gear, coupled to an output shaft driving a resistance, with the one-way rotation of each of the plurality of planetary gears; and
- varying the amplitude of the oscillatory movement in response to a varying of the resistance driven by the output shaft.

* * * * *